Patented Oct. 14, 1930

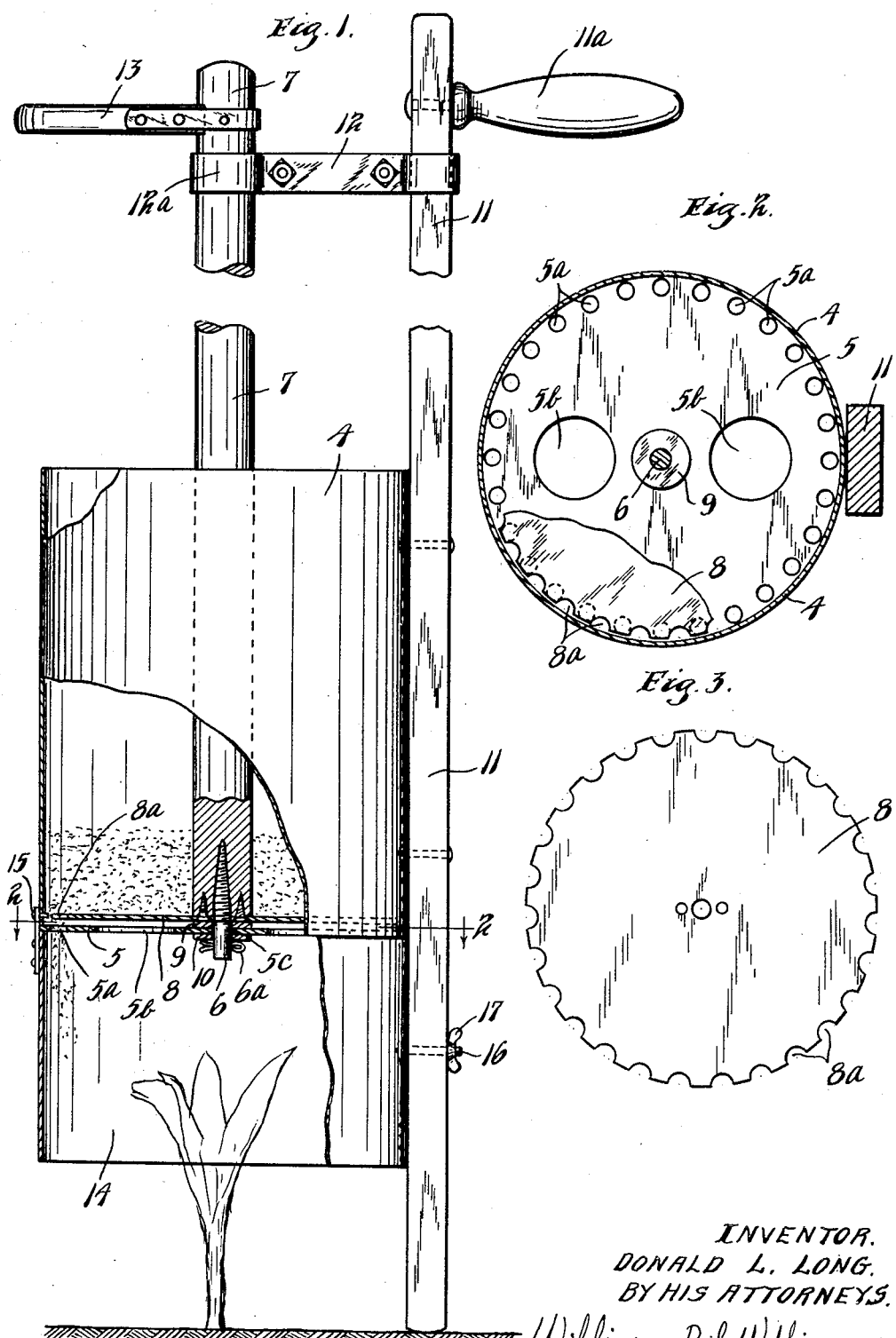

1,778,424

UNITED STATES PATENT OFFICE

DONALD L. LONG, OF WHITE BEAR LAKE, MINNESOTA

DISTRIBUTOR FOR FERTILIZER AND THE LIKE

Application filed March 19, 1928. Serial No. 262,814.

This invention relates to dispensing devices and especially to devices for distributing fertilizer or chemical about plants.

It is an object of my invention to provide extremely simple but highly efficient fertilizer or chemical distributor for use by market gardeners and owners of small farms which will efficiently and economically distribute material to the plants where the same is most needed.

It is a further object of the invention to provide a distributor of the class above described which may be conveniently manipulated by the oscillation of a handle or crank and which will cause a small circle of fertilizer or other material to be disposed about a plant.

Another object of the invention is to provide a fertilizer distributor which may dispense relatively light material placing the same in close position to the plant and capable of functioning efficiently in windy weather.

It is a more specific object of the invention to provide a fertilizing distributor for truck gardners and the like, which may be manually operated with great economy and which is mounted on an upright pole or leg adapted to be disposed adjacent a plant to be fertilized, the distribution being controlled by means of an oscillatory handle.

These and other objects and advantages of the invention will be apparent from the following description made in connection with the accompanying drawings wherein like reference characters refer to similar parts throughout the several views and in which, Fig. 1 is a side elevation of a preferred embodiment of the device with some parts being broken away and others shown in section;

Fig. 2 is a vertical section taken on the line 2—2 of Fig. 1, showing a portion of the movable plate in its relation with the apertured bottom of a container;

Fig. 3 is a plan view of the movable plate detached.

As illustrated in the drawings, I provide a substantially cylindrical receptacle 4 which may have an open upper end and a bottom 5, said bottom being provided with a series of circumferentially spaced apertures $5^a$ disposed adjacent the peripheral edge thereof and having also one or more relatively large apertures $5^b$ disposed inwardly of said apertures $5^a$. The bottom 5 is also provided with a concentric aperture $5^c$ through which a pivot pin 6 attached to an upright manipulating rod 7 may pass.

Rod 7 carries at its lower end a disc 8 having a plurality of circumferentially spaced segmentially shaped notches $8^a$ formed in the peripheral edge thereof, the diameter of said notches being substantially equal to the distance between the apertures $5^a$ in bottom 5.

Disc 8 is rigidly connected with the lower end of rod 7, extending normally thereto. Washers 9 and 10 may be disposed on the upper and under sides of the bottom 5 if desired, spacing disc 8 slightly above the bottom and facilitating the oscillation of the same. The pivot pin 6 of rod 7 projects beyond the under side of bottom 5 and may be retained in operative position by any suitable means, such as the cotter pin $6^a$. Receptacle 4 is rigidly secured adjacent the lower end of a light post 11. Said post may carry at its upper end a suitable handle $11^a$ by which the device may be carried from plant to plant. A strap 12 may be clamped to the upper portion of post 11 projecting laterally therefrom and carrying at its outer end a suitable bearing $12^a$ through which the upper end of rod 7 extends, said rod terminating in a crank arm 13 rigidly secured thereto.

I prefer to provide the bottom portion of receptacle 4 with a detachable windshield 14 which may be of annular structure approximately the diameter of receptacle 4 and of such height as to have its lower edge disposed a relatively short distance above the lower end of pole 11. Shield 14 may be detachably secured to receptacle 4 and post 11 in any suitable manner. As shown, I provide a pin equipped spring clip 15 adapted to anchor the forward portion of the upper edge of shield 14 to the lower portion of receptacle 4, while the rear portion of said shield may be rigidly and detachably secured to the lower portion of post 11 by means of a bolt 16 provided with a wing nut 17.

The operation of my device while perhaps obvious from the foregoing description, may be briefly described as follows:—

Fertilizer or other material to be distributed may be easily poured within receptacle 4 through the upper end thereof, said material being supported upon the notched disc 8. The operator then walks along a row of plants disposing the lower end of post 11 adjacent a plant with receptacle 4 in substantially vertical alinement with said plant. The crank arm 13 may then be swung from side to side causing disc 8 to oscillate and in so doing to momentarily bring the notches $8^a$ of said disc in registration with the apertures $5^a$ of the receptacle bottom, at that time permitting small amounts of fertilizing material to drop, due to the arrangement of said apertures and notches. A ring of fertilizer will be left about each plant disposed substantially concentric of the plants where it is most needed. If, in the operation of my device, some material works its way between disc 8 and the receptacle bottom 5, the same will drop through the apertures $5^b$ and will not impair the efficiency of the device.

It will be obvious that my shield 14 permits material to be dispensed properly, even in a considerable wind, since the greater part of the space between the bottom of receptacle 4 and the ground is protected by the cylindrical member 14.

From the foregoing description it will be seen that I have invented an extremely simple but highly efficient distributor for fertilizer, chemical and the like, adapted to dispense small amounts of material about plants, said material dropping in the form of a ring concentric of the plant. The economy of my device will be readily apparent, since only a small amount of fertilizer may be used if desired and the amount dispensed will be disposed close to the plant where it is most needed.

It will, of course, be understood that various changes may be made in the form, details, arrangement and proportions of the parts without departing from the scope of applicant's invention.

What is claimed is:—

1. A distributing device for fertilizer and the like, comprising a supporting pole having a handle at its upper end, whereby said pole may be held in upright position adjacent a plant, a receptacle fixed to said pole above the lower end thereof and having a plurality of circumferentially arranged discharge apertures in the bottom thereof, a shutter pivotally mounted above said bottom and having discharge apertures adapted to be brought into registration with said first mentioned discharge apertures, an operating rod secured concentrically at its lower end to said shutter and extending above said receptacle substantially parallel with said supporting pole, and a laterally projecting handle at the upper end of said rod for operating said shutter.

2. The structure set forth in claim 1, and a detachable tubular windshield adapted to be fixed to the bottom of said receptacle and extending downwardly to a point a short distance adjacent the lower extremity of said pole.

3. A distributing device for fertilizer and the like, comprising a cylindrical receptacle having a bottom provided with a multiplicity of circumferentially arranged discharge apertures adjacent the periphery thereof, a shutter pivoted to the center of said bottom and substantially covering the same, said shutter having a series of recesses adapted to intermittently register with the discharge apertures in said bottom to discharge a ring of material about a plant or the like, said bottom having an aperture disposed inwardly of said discharge aperture adapted to permit material from accumulating between said shutter and said bottom, and means for oscillating said shutter.

In testimony whereof I affix my signature.

DONALD L. LONG.